MONOSTABLE TWO-STATE APPARATUS

Filed April 29, 1957

INVENTOR
NORMAN F. MOODY &
CHARLES D. FLORIDA
BY- Smart & Biggar
ATTORNEYS

United States Patent Office 2,896,094

Patented July 21, 1959

2,896,094

MONOSTABLE TWO-STATE APPARATUS

Norman F. Moody, Ottawa, Ontario, and Charles D. Florida, Merivale Gardens, Ontario, Canada, assignors to Her Majesty The Queen in right of Canada as represented by the Minister of National Defence Application April 29, 1957, Serial No. 655,606

13 Claims. (Cl. 307—88.5)

Figures 1, 2, 3:
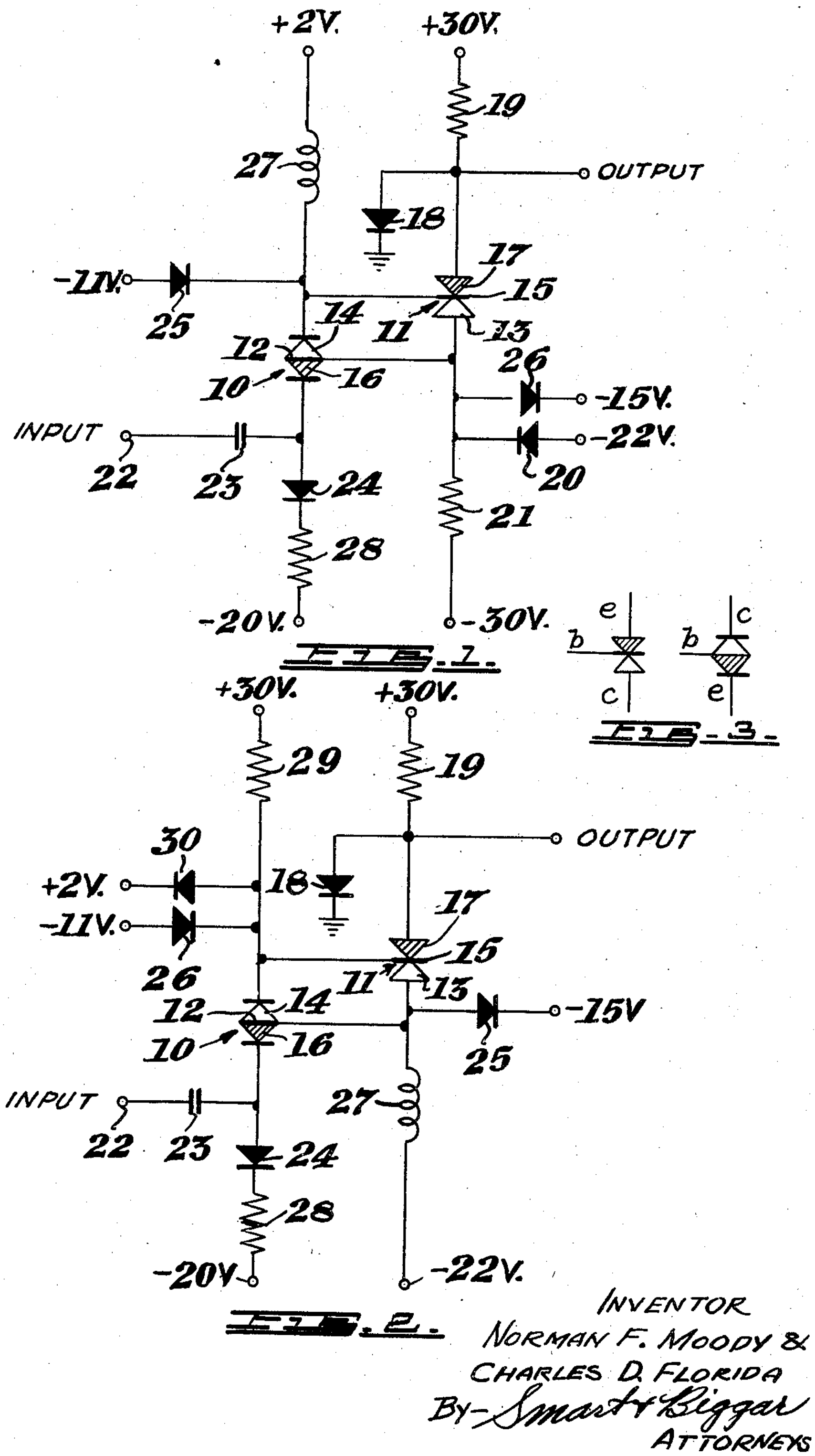

The present invention relates to the circuits of a monostable two-state apparatus which may be used for example in a digital computer.

Monostable two-state circuits having a stable and a metastable state, such as the well known one-shot multivibrator circuit, are commonly used as pulse generators, gating signal generators, time delay circuits, pulsed shaping circuits, etc., in the fields of radar, television and digital computing. In order that monostable two-state circuits be readily adaptable to various uses they should be stable, reliable and capable of providing relatively high output currents. These circuits should also have a time duration in the metastable state which can be readily calculated. In some applications it is desirable that the time duration in the metastable state be a function, preferably a linear function, of output load current. In the computer it is important that the monostable two-state circuits employ a minimum of components and consume a minimum of power, because a large number of two-state circuits may be used in a single computer.

A versatile monostable two-state apparatus which meets these requirements is provided by the present invention and comprises a semiconductor unit having an effective emitter electrode, an effective first base electrode, an effective second base electrode and an effective collector electrode; a first clamping means adapted to clamp the base electrodes at predetermined potentials when the semiconductor unit is in a state of conduction; a second clamping means adapted to clamp the collector electrode and one of the base electrodes at predetermined potentials when the semiconductor unit is in a cut-off state; means adapted to provide high impedance to surge current and low impedance to steady current connected between the other base electrode and a source of predetermined potential; an output connection taken from one of the electrodes; and an input connection taken from one of the electrodes to switch the semiconductor unit from the cut-off state to the state of conduction in response to an input signal.

The means adapted to provide high impedance to surge current and low impedance to steady current may be an inductor. The semiconductor unit may consist of a pair of complementary transistors each of which includes an emitter, a base and a collector. In this case the collector of each transistor is connected to the base of the other transistor, whereby the emitter of one transistor forms an effective emitter electrode for the semiconductor unit and the emitter of the other transistor forms an effective collector electrode for the semiconductor unit.

According to one embodiment of the invention the means adapted to provide high impedance to surge current and low impedance to steady current is connected between the first base electrode and a source of predetermined potential. According to another embodiment of the invention this means is connected between the second base electrode and a source of predetermined potential.

Some preferred embodiments of the invention will now be described with reference to the accompanying drawings in which Figure 1 is a schematic circuit diagram illustrating one embodiment of the invention, Figure 2 is a schematic circuit diagram illustrating an alternative embodiment of the invention, Figure 3 shows the symbols for transistors in Figures 1 and 2.

In the monostable two-state circuit illustrated in Figure 1, two complementary transistors 10 and 11 are interconnected to form a single n-p-n-p semiconductor unit. The base 12 of the transistor 10 is connected to the collector 13 of the transistor 11 to form an effective first base electrode for the semiconductor unit, and the collector 14 of the transistor 10 is connected to the base 15 of the transistor 11 to form an effective second base electrode for the semiconductor unit. The emitter 16 of the transistor 10 forms an effective emitter electrode for the semiconductor unit, and the emitter 17 of the transistor 11 forms an effective collector electrode of the semiconductor unit.

When the semiconductor unit, illustrated in Figure 1, is in a cut-off state the emitter 17 of the transistor 11 is clamped at ground potential because of the current passed from the +30 volt power supply through the resistor 19 and the diode 18 to ground and the second base electrode is held at +2 volts by the +2 volt power supply, so that a two volt cut-off bias appears between the base 15 and the emitter 17 of the transistor 11. The base 12 of the transistor 10 is clamped at −22 volts because of the current flowing from the −22 volt power supply through the diode 20 and the resistor 21 to the −30 volt power supply. The emitter 16 of the transistor 10 is held at −20 volts by the −20 volt power supply. Consequently a cut-off bias of 2 volts appears between the base 12 and the emitter 16 of the transistor 10. The semiconductor unit is in this manner clamped in the cut-off state and will remain stable.

When a negative input pulse, having sufficient amplitude to overcome the 2 volt bias between the base 12 and the emitter 16 of the transistor 10, appears at the input terminal 22, the capacitor 23 will be forced to discharge and this current cannot flow through the diode 24 so that an electron current is forced to flow from the emitter 16 to the base 12 of the transistor 10. As a result the transistor 10 commences to conduct and its collector 14 falls in potential. The decreased voltage appearing at the collector 14 of the transistor 10, and consequently at the base 15 of the transistor 11, results in the transistor 11 commencing to conduct. When transistor 11 conducts its collector 13 starts to rise from its initial value of −22 volts, and this rising potential represents a forward drive of the transistor 10. In this manner a regenerative condition is established which results in the transistors 10 and 11 being forced into further conduction. The collector 14 of the transistor 10 will be prevented from falling below −11 volts by the diode 25 which is connected between the collector 14 of the transistor 10 and a −11 volt power supply, and the collector 13 of the transistor 11 will be prevented from rising above −15 volts by the diode 26 which is connected between the collector 13 of the transistor 11 and the −15 volt power supply. Consequently the n-p-n-p unit is prevented from reaching a saturated state.

When the semiconductor unit is initially switched from the cut-off state to the state of conduction and the current of the collector 14 of transistor 10 is increasing the reactance of the inductor 27 will be high, and consequently the electron current of the collector 14 must flow from the base 15 to the emitter 17 of the transistor 11 or through the diode 25 to the −11 volt power supply. As time passes a third path for this electron current of the collector 14 is provided through the inductor 27. The current passed by this inductor 27 will increase as time passes and this current will be taken from the current that initially flowed through diode 25. The current of the inductor 27 will eventually build up to a value at which there will be no current left to flow through diode 25, and the current of the base 15 of transistor 11 will then be forced to decrease as the impedance of the inductor 27 continues to fall. Consequently the current of the collector 13 of the transistor 11 will decrease and the potential of the base 12 of the transistor 10 will start to fall towards the −30 volt power supply. As the base 12 of the transistor 10 falls in potential the forward drive of transistor 10 is reduced which results in a reduction in the current of the collector 14 of the transistor 10. In this manner a regenerative conduction is established which results in the two transistors 10 and 11 returning to the cut-off state.

The time duration in the metastable state of conduction can be seen from the above discussion to be dependent on the time required for the current passing through the inductor 27 to build up to the value of the current which was initially passed by the diode 25. This time duration can be calculated in the manner described below and for the purposes of illustration the resistor 19 will be given a value of 3300 ohms and the resistor 28 will be given a value of 680 ohms.

When the monostable two-state circuit illustrated in Figure 1 is switched from the cut-off state to the state of conduction the collector 14 of the transistor 10 falls rapidly to −11 volts. The inductor 27 will provide a high impedance to this rapidly increasing electron current leaving the collector 14 of the transistor 10 and consequently the initial currents in the n-p-n-p unit are as follows:— the current of the emitter 16 of the transistor 10 is:

$$\frac{-15-(-20)}{680}=7.35 \text{ milliamperes}$$

The current of the collector 14 of the transistor 10 is:

$$7.35\alpha_2 \text{ milliamperes}$$

where $\alpha_2$ is the collector to emitter current gain of transistor 10.

The current of the base 15 of the transistor 11 is:

$$\frac{[30-(-11)](1-\alpha_1)}{3300}=12.4(1-\alpha_1) \text{ milliamperes}$$

where $\alpha_1$ is the collector to emitter current gain of transistor 11.

The current of the diode 25 is equal to the difference between the current of the collector 14 of the transistor 10 and the current of the base 15 of the transistor 11 and is:

$$7.35\alpha_2-12.4(1-\alpha_1) \text{ milliamperes.}$$

The current flowing through the inductor 27 will build up at a rate of:

$$\frac{di}{dt}=\frac{V}{L}$$

where:

$i$ is the current flowing through the inductor 27 measured in amperes,
$t$ is time measured in seconds,
V is the voltage across the inductor 27 measured in volts, and
L is the value of the inductor 27 measured in henries.

The current flowing through the inductor 27 at any time $t$ is then:

$$i=\frac{Vt}{L}$$

The time duration of the state of conduction is dependent on the time required for the current flowing through the inductor 27 to build up to the value of current that was initially flowing through diode 25 (calculated above) and this time duration is therefore governed by the expression:

$$\frac{Vt}{L}=[7.35\alpha_2-12.4(1-\alpha_1)]\times10^{-3}$$

or $$t=\frac{L}{V}[7.35\alpha_2-12.4(1-\alpha_1)] \text{ milliseconds}$$

In the circuit illustrated in Figure 1, V is equal to 13 volts and therefore in this example:

$$t=\frac{L}{13}[7.35\alpha_2-12.4(1-\alpha_1)] \text{ milliseconds}$$

Transistors having α's of not less than 0.98 can be readily obtained and when transistors of this type are used in the term involving $(1-\alpha_1)$, in the expression governing the time duration of the metastable state, becomes negligible compared to the terms involving $\alpha_2$, and therefore this expression can be reduced to:

$$t=\frac{L}{13}7.35\alpha_2 \text{ milliseconds}$$

Thus it is seen that the time duration of the metastable state is linearly dependent on the value of the inductor 27, is practically independent of output load current, and that this time duration can be readily calculated.

The circuit of Figure 2 illustrates a manner in which the monostable two-state apparatus can be constructed so that its time duration in the metastable state will be dependent on load current. In this circuit the inductor 27 is connected between the collector 13 of the transistor 11 and a −22 volt power supply. When this circuit is in the cut-off state the emitter 16 of the transistor 10 is clamped at −20 volts by the −20 volt power supply which is connected to the emitter 16 of the transistor 10 through the series connected diode 24 and resistor 28, and the base 12 of the transistor 10 is clamped at −22 volts by the −22 volt power supply which is connected to the base 12 through the inductor 27. Consequently a cut-off bias of 2 volts appears between the base 12 and the emitter 16 of the transistor 10. The base 15 of the transistor 11 is clamped at +2 volts, when the semiconductor unit is in a cut-off state because of the current passed from the +30 volt power supply through the resistor 29 and the diode 30 to the +2 volt power supply, and the emitter 17 of the transistor 11 is clamped at ground potential because of the current passed from the 30 volt power supply through the resistor 19 of the diode 18 to ground. Consequently a cut-off bias of 2 volts appears between the base 15 and the emitter 17 of the transistor 11. In this manner the circuit illustrated in Figure 2 is clamped in the cut-off state and will remain stable.

When an input trigger pulse appears at the input terminal 22 the transistors 10 and 11 will be switched from the cut-off state to the state of conduction in the manner described above with reference to the circuit illustrated in Figure 1. In this embodiment (Figure 2) the potential of the collector 14 of transistor 10 will be prevented from falling below −11 volts by conduction of the diode 26, and the potential of the collector 13 of transistor 11 will be prevented from rising above −15 volts by conduction of the diode 25. Consequently the n-p-n-p unit is prevented from reaching a saturated state.

When this circuit is initially switched from the cut-off state to the state of conduction and the current of the collector 13 of the transistor 11 is increasing the reactance of the inductor will be high, and consequently the electron current of the collector 13 must flow through the diode 25, and also from the base 12 to the emitter 16 of the transistor 10. As time passes a third path for this electron current will be provided through the inductor 27 which will demand an increasing current. Eventually the current flowing through the inductor 27 will build up to a value at which there will be no current left to flow through the diode 26, and the current of the base 12 of the transistor 10 will then be forced to decrease as the impedance of the inductor 27 continues to fall. Consequently the potential of the base 12 of the transistor 10 will start to fall toward the −22 volt power supply and this falling potential will decrease the current of the collector 14 of the transistor 10 with the result that the potential of the base 15 of the transistor 11 will start to rise towards the +30 volt power supply. This rising potential will decrease the current of the collector 13 of the transistor 11 and a regenerative condition is established which will result in the two transistors 10 and 11 returning to the cut-off state.

It can be seen from the above discussion that the dwell time in the metastable state is again dependent on the time required for the current of the inductor 27 to rise to a value which is equal to the current initially passed by the diode 26. The current initially passed by the diode 26 is dependent on the current of the emitter 17 of the transistor 11 which in turn is the output load current. Consequently the time duration of this circuit in the metastable state will be dependent on load current, as will be shown mathematically below.

When the monostable two-state circuit illustrated in Figure 2 is switched from the cut-off state to the state of conduction the reactance of the inductor 27 is relatively high and, consequently, the initial currents in the n-p-n-p unit are as follows:

The current of the collector 13 of the transistor 11 is:

$$\frac{[30-(-11)]\alpha_1}{Z_L}=\frac{41\alpha_1}{Z_L}\text{ amperes}$$

where $\alpha_1$ is the collector to emitter current gain of transistor 11, and $Z_L$ is the output load impedance seen by the emitter 17 of the transistor 11.

The current of the base 12 of the transistor 10 is:

$$\frac{-15-(-20)(1-\alpha_2)}{R_{28}}=\frac{5}{R_{28}}(1-\alpha_2)\text{ amperes}$$

where $R_{28}$ is the resistance of the resistor 28 measured in ohms.

The current of the diode 25 is equal to the difference between the current of the collector 13 of the transistor 11 and the current of the base 12 of the transistor 10 and is:

$$\frac{41\alpha_1}{Z_L}-\frac{5}{R_{28}}(1-\alpha_2)\text{ amperes}$$

The current flowing through the inductor 27 will build up at a rate of:

$$\frac{di}{dt}=\frac{V}{L}$$

where:

$i$ is the current flowing through the inductor 27 measured in amperes,
$t$ is time measured in seconds,
V is the voltage across the inductor 27 measured in volts, and
L is the value of the inductor 27 measured in henries.

The current flowing through the inductor 27 at any time $t$ is then:

$$i=\frac{Vt}{L}$$

The time duration of the state of conduction is dependent on the time required for the current flowing through the inductor 27 to build up to the value of current that was initially flowing through diode 25 (calculated above) and this time duration is therefore governed by the expression:

$$\frac{Vt}{L}=\frac{41\alpha_1}{Z_L}-\frac{5}{R_{28}}(1-\alpha_2)$$

or $$t=\frac{L}{V}\left[\frac{41\alpha_1}{Z_L}-\frac{5}{R_{28}}(1-\alpha_2)\right]$$

In the circuit illustrated in Figure 2, V is equal to 7 volts and therefore in this example:

$$t=\frac{L}{7}\left[\frac{41\alpha_1}{Z_L}-\frac{5}{R_{28}}(1-\alpha_2)\right]\text{ seconds}$$

Transistors having $\alpha$'s of not less than 0.98 can be readily obtained and when transistor 10 is of this type the term involving $(1-\alpha_2)$ can be neglected and therefore this expression can be reduced to:

$$t=\frac{L\alpha_1}{7}\frac{41}{Z_L}$$

The current of the collector 13 of transistor 11 was shown above to be $$\frac{41\alpha_1}{Z_L}$$

and therefore the load current seen by the emitter 17 of the transistor 11 is equal to $$\frac{41}{Z_L}$$

so that the expression governing the time duration of the metastable state can be written:

$$t=\frac{L\alpha_1}{7}\times(\text{output load current})$$

Thus it is seen that the time duration of the metastable state of the circuit illustrated in Figure 2 is linearly dependent on the output load current, and that this dependence can be controlled by the selection of the inductor 27.

The circuits described in this specification can of course be modified to employ complementary transistors, that is, each n-p-n transistor can be replaced by a p-n-p transistor and each p-n-p transistor can be replaced by an n-p-n transistor. A p-n-p-n semiconductor unit may be substituted for the n-p-n-p semiconductor unit in Figures 1 and 2. When this is done the polarity of the appropriate power supplies, diodes, and biasing means must be reversed and the resulting circuit will function in the same manner as described herein but will provide output signals of opposite polarity to the output signals of the circuits illustrated in the drawings.

What we claim as our invention is:

1. A monostable two-state apparatus responsive to an input signal to switch from a stable cut-off state to a state of conduction, comprising a semiconductor unit having an effective emitter electrode, an effective first base electrode, an effective second base electrode, and an effective collector electrode; a first clamping means adapted to clamp the base electrodes at predetermined potentials when the semiconductor unit is in the state of conduction; a second clamping means adapted to clamp the collector electrode and one of the base electrodes at predetermined potentials when the semiconductor unit is in the cut-off state; an inductor connected between the other base electrode and a source of predetermined potential; an output connection taken from one of the electrodes; and an input connection taken from one of the electrodes to switch the semiconductor unit from the cut-off state to the state of conduction in response to the input signal.

2. Apparatus as claimed in claim 1, in which the semiconductor unit comprises a pair of complementary transistors; each of the transistors including an emitter, a base, and a collector; the collector of each transistor being connected to the base of the other transistor; whereby the emitter of one transistor forms an effective emitter electrode for said semiconductor unit, and the emitter of the other transistor forms an effective collector electrode for said semiconductor unit.

3. Apparatus as claimed in claim 1, in which the inductor is connected between the second base electrode and a source of predetermined potential.

4. Apparatus as claimed in claim 1, in which the inductor is connected between the first base electrode and a source of predetermined potential.

5. Apparatus as claimed in claim 1, in which the second clamping means includes a diode connected to said other base electrode and a source of predetermined potential to pass current when the semi-conductor unit is in a cut-off state, and includes a diode connected between the collector electrode and a source of predetermined potential to pass current when the semiconductor unit is in the cut-off state.

6. Apparatus as claimed in claim 1, comprising a resistor connected between said collector electrode and a source of predetermined potential, a resistor connected between said other base electrode and a source of predetermined potential; the first clamping means including a diode connected between the first base electrode and a source of predetermined potential to pass current when the semiconductor unit is in a state of conduction, and including a diode connected between the second base electrode and a source of predetermined potential to pass current when the semiconductor unit is in the state of conduction.

7. Apparatus as claimed in claim 1, comprising a diode and a resistor series connected between said emitter electrode and a source of predetermined potential to pass current when the semiconductor unit is in the state of conduction, and a capacitor connected between said emitter electrode and the input connection.

8. Apparatus as claimed in claim 1, in which the output connection is taken from said collector electrode.

9. Apparatus as claimed in claim 2, in which the inductor is connected between the second base electrode and a source of predetermined potential.

10. Apparatus as claimed in claim 2, in which the inductor is connected between the first base electrode and a source of predetermined potential.

11. Apparatus as claimed in claim 2, in which the second clamping means includes a diode connected to said other base electrode and a source of predetermined potential to pass current when the semiconductor unit is in a cut-off state, and includes a diode connected between the collector electrode and a source of predetermined potential to pass current when the semiconductor unit is in the cut-off state.

12. Apparauts as claimed in claim 2, comprising a resistor connected between said collector electrode and a source of predetermined potential, a resistor connected between said other base electrode and a source of predetermined potential; the first clamping means including a diode connected between the first base electrode and a source of predetermined potential to pass current when the semiconductor unit is in a state of conduction, and including a diode connected between the second base electrode and a source of predetermined potential to pass current when the semiconductor unit is in the state of conduction.

13. Apparatus as claimed in claim 2, comprising a diode and a resistor series connected between said emitter electrode and a source of predetermined potential to pass current when the semiconductor unit is in the state of conduction, and a capacitor connected between said emitter electrode and the input connection.

References Cited in the file of this patent

UNITED STATES PATENTS

| | | |
|---|---|---|
| 2,655,609 | Shockley | Oct. 13, 1953 |
| 2,655,610 | Ebers | Oct. 13, 1953 |
| 2,724,061 | Emery | Nov. 15, 1955 |
| 2,744,198 | Raisbeck | May 1, 1956 |
| 2,770,732 | Chong | Nov. 13, 1956 |
| 2,802,067 | Zawels | Aug. 6, 1957 |

FOREIGN PATENTS

| | | |
|---|---|---|
| 1,110,585 | France | Oct. 12, 1955 |

OTHER REFERENCES

The Transistor Regenerative Amplifier as a Computer Element, Chaplin, October 1954, Proc. of the Inst. of E.E., vol. 101, part III, No. 73.